Nov. 4, 1952  F. L. DUNLAP  2,616,717
TRAILER HITCH COVER
Filed Aug. 1, 1949

INVENTOR.
FREDDIE L. DUNLAP,
BY Wilfred E. Lawson
ATTORNEY.

Patented Nov. 4, 1952

2,616,717

UNITED STATES PATENT OFFICE 2,616,717

TRAILER HITCH COVER

Freddie Leon Dunlap, Fullerton, Calif.

Application August 1, 1949, Serial No. 107,879

1 Claim. (Cl. 280—33.17)

This invention relates to a trailer hitch cover structure and it is an object of the invention to provide a structure of this kind for covering trailer hitches of private automobiles to overcome the objectionable appearance of the conventional trailer hitch when it is not attached to a trailer.

The invention consists in the details of construction and in the combination and arrangement of the several parts of my improved trailer hitch cover whereby certain advantages are attained, as will be hereinafter more fully set forth.

In order than my invention may be better understood, I will now proceed to describe the same with reference to the accompanying drawings, wherein.

Figure 1:
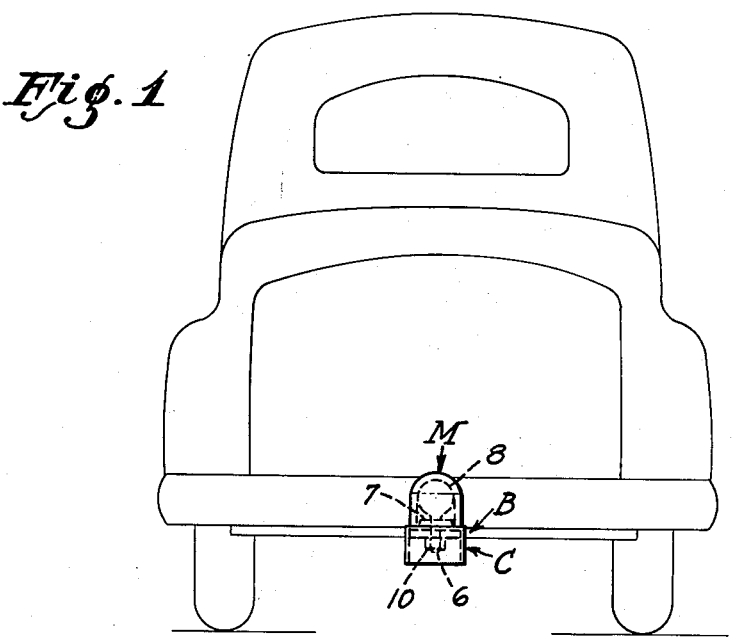
Figure 1 is a view in rear elevation of a vehicle having applied thereto a trailer hitch cover constructed in accordance with an embodiment of the invention.

As disclosed in the accompanying drawings, B denotes a hitch bar of a conventional type as generally employed in connection with private automobiles. The outer end portion of the bar B is provided therethrough with an opening 1 with which registers an opening 2 in the outer portion of the elongated plate 3 comprised in the lower cover member C of the structure.

The outer end of the plate 3 of the member C, in the present embodiment of the invention is rounded and the side margins and the forward rounded margins are defined by a continuous depending flange 4. The forward portion of the flange 4, extends a material distance below the hitch bar B when the member C is mounted therein while the rear or free end portions of the flange 4 are reduced, as at 5, to a width closely approaching the thickness of the hitch bar B. This is done to increase the aesthetic value of member C.

Insertible from above through the registering openings 1 and 2 is a stud 6 depending from the axial center of a base plate 7 of a conventional type of ball hitch 8 except that the ball hitch 8 at its top center has drilled therein a threaded socket 9 for a purpose to be later referred to.

The base plate 7 limits the extent of insertion of the stud 6 down through the registering openings 1 and 2 by contact with the plate 3. The stud 6 is of a length to permit the threading thereon below the hitch bar B of a clamp nut 10 contacting from below with the hitch bar B. The nut 10 together with the plate 7 effectively maintains the lower member C and the hitch ball 8 applied in working position.

It is also to be noted that the plate 3 through the major portion of its length is of a width between the side portions of the flange 4 substantially the same as the width of the hitch bar B so that the side portions of the flange 4 have close contact with the side edges of the bar B.

The top member M of the structure comprising a cylindrical tubular body 11 open at one end and having its opposite end closed by a semi-spherical head 12 of substantially the same radius as the ball hitch 8 so that when the member M is in applied position to house the ball hitch 8 said head 12 will have close contact with the hitch 8. The body 11 is of a length to have close contact with the upper face of the plate 3 of the lower member C when the top member M is in fully applied position.

Extending inwardly of the top member M from the axial center of the head 12 is a threaded stud 13 which, as the member M is applied, threads into the socket 9 of the ball hitch 8 whereby the member M is effectively held in applied position.

Figure 2:
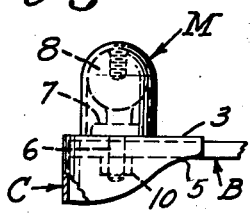
Figure 2 is a view in side elevation of the cover as comprised in Figure 1, the conventional hitch bar being in fragment.
Figure 3:
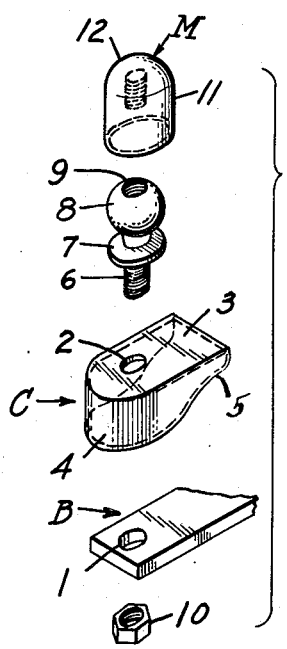
Figure 3 is an exploded view in perspective illustrating the several parts as comprised in Figure 2.
Figure 4:
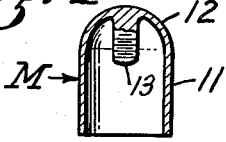
Figure 4 is a vertical sectional view taken through the top cover member of the cover structure, a portion being in elevation.

As is clearly shown in Figures 1 and 2 of the drawings, the applied top member M entirely houses and conceals the ball hitch 8 and the base plate 7 while the applied lower member houses and conceals the lower portion of the stud 6 and the nut 10 applied thereon.

It is also believed to be self-evident that when it is desired to use the hitch ball the members M and C may be readily removed with the same facility with which they can be applied.

From the foregoing description it is thought to be obvious that a trailer hitch cover constructed in accordance with my invention is particularly well adapted for use by reason of the convenience and facility with which it may be assembled and operated.

I claim:

In a cover for a bar and ball screw type of trailer hitch of motor vehicles, a lower elongated cover member engaged over the exposed end portion of the hitch bar and enclosing the top and sides thereof, said hitch bar and the cover member having registering apertures in the same to receive the threaded shank of the ball screw, the ball portion of the ball screw having a threaded socket in its top side aligned with its shank, a top cover member engaged over the said ball portion and seated upon the first cover member, and a threaded stud depending within the top cover member from the center of the upper end thereof and engaged in said socket, said shank having a nut on its free end below the hitch bar to clamp the ball screw and the cover members in place when it is tightened against the lower side of the hitch bar.

FREDDIE LEON DUNLAP.

REFERENCES CITED

The following references are of record in the file of this patent:

UNITED STATES PATENTS

| Number | Name | Date |
|---|---|---|
| 627,802 | Chesson | June 27, 1899 |
| 1,017,173 | Ryan | Feb. 13, 1912 |
| 1,889,297 | Russell | Nov. 29, 1932 |
| 2,342,907 | Stall | Feb. 29, 1944 |
| 2,464,423 | Walkowiak | Mar. 15, 1949 |
| 2,517,176 | Brock | Aug. 1, 1950 |

FOREIGN PATENTS

| Number | Country | Date |
|---|---|---|
| 501,462 | Great Britain | Feb. 28, 1939 |